(12) United States Patent
Kargl

(10) Patent No.: US 7,156,314 B2
(45) Date of Patent: Jan. 2, 2007

(54) CHIP CARD

(75) Inventor: Walter Kargl, Graz (AT)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 11/227,964

(22) Filed: Sep. 14, 2005

(65) Prior Publication Data
US 2006/0032927 A1    Feb. 16, 2006

Related U.S. Application Data

(63) Continuation of application No. PCT/DE04/00467, filed on Mar. 10, 2004.

(30) Foreign Application Priority Data
Mar. 18, 2003 (DE) ................. 103 11 966

(51) Int. Cl.
G09K 19/06    (2006.01)
(52) U.S. Cl. ..................... 235/492; 235/451
(58) Field of Classification Search ................ 235/451, 235/492, 439–441
See application file for complete search history.

(56) References Cited
U.S. PATENT DOCUMENTS

| | | | |
|---|---|---|---|
| 5,929,414 A * | 7/1999 | Saitoh | 235/380 |
| 6,003,777 A | 12/1999 | Kowalski | |
| 6,045,043 A | 4/2000 | Bashan et al. | |
| 6,105,874 A * | 8/2000 | Berger et al. | 235/492 |
| 6,145,749 A * | 11/2000 | Thuringer et al. | 235/492 |
| 6,168,083 B1 * | 1/2001 | Berger et al. | 235/492 |
| 6,364,207 B1 * | 4/2002 | Thuringer et al. | 235/492 |
| 6,394,347 B1 * | 5/2002 | Kitai et al. | 235/440 |
| 6,572,015 B1 * | 6/2003 | Norton | 235/382 |
| 6,572,023 B1 * | 6/2003 | Takabayashi | 235/492 |
| 6,859,031 B1 * | 2/2005 | Pakdaman et al. | 324/233 |

\* cited by examiner

Primary Examiner—Kimberly D. Nguyen
(74) Attorney, Agent, or Firm—Dickstein, Shapiro, LLP.

(57) ABSTRACT

A chip card having a contact-type interface having first loads associated therewith and capable of transmitting power and data, and a contactless interface having second loads associated therewith and capable of transmitting power and data. In a dual mode of operation data are transmitted via the contactless interface, the second loads are supplied with power via the contactless interface, third loads, which are in operation regardless of the interface used, are supplied with power via the contact-type interface, and the first loads are supplied or not supplied with power via the contact-type interface.

10 Claims, 1 Drawing Sheet

CHIP CARD

CROSS-REFERENCE TO RELATED APPLICATION

This application is a continuation of International Patent Application Serial No. PCT/DE2004/000467, filed Mar. 10, 2004, which published in German on Sep. 30, 2004 as WO 2004/084126, and is incorporated herein by reference in its entirety.

FIELD OF THE INVENTION

The invention relates to a chip card having a contactless interface and a contact-type interface, each of the interfaces being able to be used to transmit power and data, and only the contact-type interface being in operation in a first mode of operation, only the contactless interface being in operation in a second mode of operation and the contactless and contact-type interfaces being in operation in a third mode of operation.

BACKGROUND OF THE INVENTION

Such chip cards are known by the label "dual interface chip cards". In the contact-type mode of operation, such a chip card behaves like a conventional contact-type chip card, i.e. the power supply and data interchange take place together via contact pads on the surface of the card which are arranged with corresponding mating contacts in a read/write appliance. In the contactless mode of operation, a dual interface chip card behaves like a known contactless chip card, i.e. both the power and the data interchange are provided via an antenna, for example a loop antenna, so that an additional power supply does not need to be provided on the chip card for the purpose of operating the electrical components. In the case of the dual face chip cards, the first and second modes of operation are alternated depending on the read/write appliance with which communication is intended. In the contact-type mode of operation, both the power supply and the data traffic are thus provided via the contact-type interface, whereas in the contactless second mode of operation the power supply and the data interchange are provided via the contactless interface.

One example of use of such a chip card is in mobile telephones, where firstly the card is used as a SIM card and secondly additional functions are implemented via the contactless interface, such as the performance of authentication to an automated teller machine or to a computer system, these appliances having contactless interfaces for communicating with the chip card in the mobile telephone.

A problem in this case is that the range in the second, contactlessly operating mode of operation is limited by virtue of a relatively large amount of power being required for operating the chip card and hence error-free data transmission no longer being ensured when the read/write appliance's field is relatively weak.

SUMMARY OF THE INVENTION

A chip card including a contact-type interface having first loads associated therewith and capable of transmitting power and data, and a contactless interface having second loads associated therewith and capable of transmitting power and data. In a dual mode of operation data are transmitted via the contactless interface, the second loads are supplied with power via the contactless interface, third loads, which are in operation regardless of the interface used, are supplied with power via the contact-type interface, and the first loads are supplied or not supplied with power via the contact-type interface.

BRIEF DESCRIPTION OF THE DRAWING

The invention is explained in more detail below using an exemplary embodiment.

DETAILED DESCRIPTION OF PREFERRED EMBODIMENTS OF THE INVENTION

Figure 1:
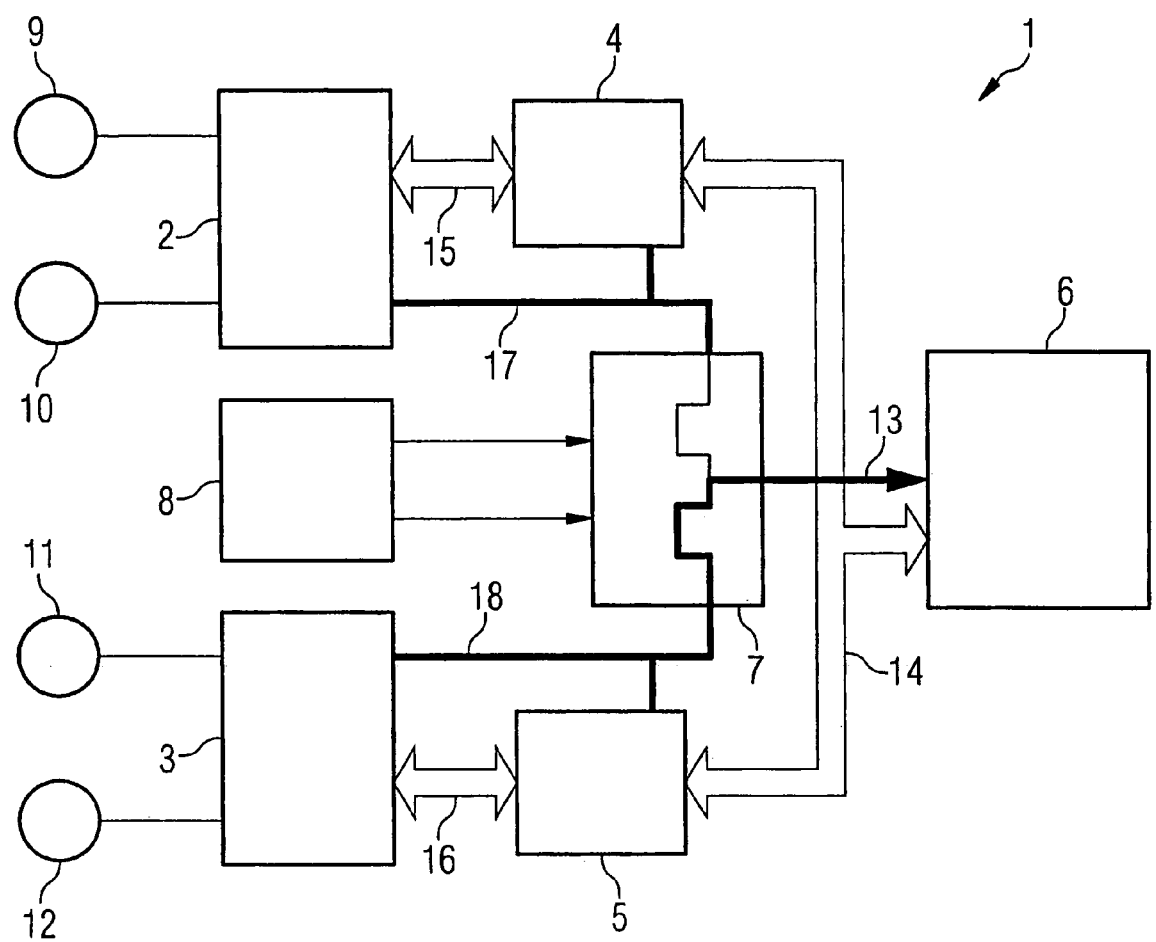
FIG. 1 shows a block diagram of a chip card based on the invention.

It is an object of the invention to specify a dual interface chip card which has a long range even in the contactless mode of operation.

The invention achieves this object by means of a chip card of the type mentioned at the outset which is characterized in that a third mode of operation is provided in which data are transmitted via the contactless interface, the first loads and third loads, which are in operation regardless of the interface used, are supplied with power via the contact-type interface and the second loads are supplied with power via the contactless interface.

In the third mode of operation of the inventive chip card, there is thus a mixed mode in which the power is drawn via the contact-type interface while the data interchange takes place via the contactless interface. The power provided for the contactless interface via the read/write appliance's field can thus be used almost entirely for the data interchange. The power requirement of the second loads is very low and has only an insignificant adverse effect on the data transmission via the contactless interface. A further advantage is that higher qualities of resonant circuit can be used for the contactless interface and hence better ranges are achieved. A further advantage is that in the contactless mode of operation the supply power and communication power are decoupled. This results in better CPU noise suppression during contactless operation, since interference from the CPU cannot be transmitted to the contactless interface via the supply lines.

It is particularly favorable that the modulation in the data traffic between the chip card and the read/write appliance can be left open without the power supply being at risk. In particular, it is possible to use ASK 100% modulation.

In advantageous embodiments, a purely contact-type mode of operation and a purely contactless mode of operation are additionally provided in which power and data are respectively transmitted via the same interface.

The block diagram of a chip card 1 which is shown in FIG. 1 shows the fundamental components which are present for the present invention. A data processing unit 6 forms a cart in which received data are processed and data for transmission are provided. The data processing unit 6 is connected to two interfaces 2 and 3 via a data BUS 14, one of the interfaces being a contactless interface 2 and the other interface being a contact-type interface 3. Connected between the data processing unit 6 and the interfaces 2 and 3 are level shifters 4 and 5 which are used to match the voltage level between the interfaces and the data processing unit 6. The level shifter 4 is associated with the contactless interface 2 and the level shifter 5 is associated with the contact-type interface 3. The level shifters are connected to the respective interface 2 and 3 via data lines 15 and 16.

The contactless interface 2 can be accessed via an antenna which is connected to the contactless interface 2 by means of connections 9 and 10. The contact-type interface 3 is accessed via a power supply connection 12 and via data connections 11. In one specific embodiment, the power supply is naturally provided via two contacts 12 and there are also a plurality of contacts 11 for the data transmission.

The data processing unit 6 is connected to a power supply network 13 which is used to supply it with the power required for operation. Power can be supplied to the power supply network 13 both via the contact-type interface 3 and via the contactless interface 2. For this purpose, a power supply controller 7 is provided which is connected firstly to the power supply network 13 and secondly to the interfaces 2 and 3. Power supply lines 17 and 18 which connect the power supply controller to the interfaces 2 and 3 are additionally connected to the level shifters 4 and 5.

The power supply controller 7 is either able to connect the power supply network 13 to one of the interfaces 2 and 3 or else to connect the two interfaces 2 and 3 to the power supply network 13. In addition, regulating functions are implemented which regulate the voltage supplied by the interfaces to the level required for operating the data processing unit 6. The function of the power supply controller is determined by an operating mode controller 8 which is connected to the power supply controller 7 for this purpose.

In the operating situation shown, the chip card is in the dual mode of operation. Data received from the contactless interface 2 can reach the data processing unit via the level shifter 4 or can conversely be sent from the data processing unit. The level shifter 4 forms a second load, which is associated only with the contactless interface 2. It is required only if data are also to be transmitted via the contactless interface 2. In a purely contact-type mode of operation, this second load does not need to be supplied with power.

The second level shifter 5 forms a first load, which is associated only with the contact-type interface 3, i.e. is required only if data are also to be transmitted via the contact-type interface.

The data processing unit 6 forms a third load, which needs to be supplied with power regardless of the mode of operation chosen.

In the dual mode of operation shown, data need to be transmitted via the contactless interface, as described. If the power required for the data processing unit were likewise to be provided via the contactless interface 2, this would entail restrictions for the data transmission, for example ASK 100% modulation would adversely affect the power supply such that the data processing unit 6 would no longer be able to be supplied sufficiently with power. For this reason, a lesser depth of modulation is often used, for example ASK 10% modulation. Although this type of modulation supplies sufficient power for the data processing unit 6, it is much more difficult to identify the data signal and a shorter range must be expected.

In the dual mode of operation, the level shifter 4 is supplied with power only via the contactless interface 2, however. The power supply controller decouples the power supply line 17 from the power supply network 13. In accordance with the insight that when transmitting data via the contactless interface 2 it is in many cases nevertheless possible to supply power via the contact-type interface 3, the power supply controller 7 connects the power supply network 13 to the contact-type interface 3 via the power supply line 18. The interconnected line sections can be discerned from the bold illustration. In the dual mode of operation based on the invention, the power supply to the data processing unit 6 and to other jointly used loads is thus ensured and at the same time the data transmission via the contactless interface 2 can be optimized.

In the exemplary embodiment shown, it is a very simple matter to set a different mode of operation too, that is to say a purely contact-type mode of operation or a purely contactless mode of operation. In the case of the purely contactless mode of operation, the power supply controller 7 would likewise connect the power supply network 13 to the contactless interface 2. In the contact-type mode of operation, both the data transmission and the power transmission would be provided via the contact-type interface 3.

In the above consideration, it has been assumed that in the dual mode of operation the contactless interface 2 is used to transmit only data and the contact-type interface 3 is used to transmit only power. The power supply for the level shifter 5 was therefore insignificant. The dual mode of operation may also be extended such that data are transmitted both via the contactless interface and via the contact-type interface, while the power is drawn only via the contact-type interface 3. In this case, the power supply for the level shifter 5, which forms a first load, is likewise provided via the contact-type interface.

The groups of the first, second and third loads are naturally not limited to the components illustrated, but rather these groups of loads may also be allocated other components. The only significant matter during allocation is whether the component to be allocated is used only in the purely contactless mode of operation, only in the contact-type mode of operation or is always required regardless of the mode of operation chosen.

What is claimed is:

1. A chip card comprising:
   a contact interface having first loads associated therewith and capable of transmitting power and data; and
   a contactless interface having second loads associated therewith and capable of transmitting power and data;
   wherein in a dual mode of operation data are, transmitted via the contactless interface, the second loads are supplied with power via the contactless interface, third loads, which are in operation regardless of the interface used, are supplied with power via the contact interface, and the first loads are supplied or not supplied with power via the contact interface.

2. The chip card as claimed in claim 1, further comprising a common power supply network, which can be connected to both interfaces in order to supply power,
   wherein the dual mode of operation prevents power from being supplied from the contactless interface to the power supply network.

3. The chip card as claimed in claim 2, further comprising a power supply controller, which is connected to the power supply network and to the interfaces, for connecting the power supply network to one or both of the interfaces.

4. The chip card as claimed in claim 3, further comprising an operating mode controller, which is connected to the power supply controller, for determining a function of the power supply controller.

5. The chip card as claimed in claim 1, wherein in a contact-type mode of operation, data and power are transmitted only via the contact interface.

6. The chip card as claimed in claim 1, wherein in a purely contactless mode of operation, both data and power are transmitted only via the contactless interface.

7. The chip card as claimed in claim 1, further comprising a common power supply network means, which can be connected to both interfaces in order to supply power, wherein the dual mode of operation prevents power from being supplied from the contactless interface to the power supply network means.

8. The chip card as claimed in claim 7, further comprising a power supply controlling means, which is connected to the power supply network means and to the interfaces, for connecting the power supply network to one or both of the interfaces.

9. The chip card as claimed in claim 8, further comprising an operating mode controlling means, which is connected to the power supply controlling means, for determining a function of the power supply controlling means.

10. A chip card comprising:
a contactless interface capable of transmitting power and data; and
a contact interface capable of transmitting power and data,
wherein in a first mode of operation only the contact interface is in operation, in a second mode of operation only the contactless interface is in operation, and in a third mode of operation data are transmitted via the contactless interface and power is transmitted via the contact interface.

* * * * *